(No Model.) 6 Sheets—Sheet 1.
J. B. HADAWAY.
STITCH SEPARATING AND INDENTING MACHINE.

No. 537,823. Patented Apr. 23, 1895.

Fig. 1.

(No Model.) 6 Sheets—Sheet 2.

J. B. HADAWAY.
STITCH SEPARATING AND INDENTING MACHINE.

No. 537,823. Patented Apr. 23, 1895.

Fig. 2.

Witnesses:
Walter E. Lombard.
H. Theodore Fletcher.

Inventor:
John B. Hadaway,
by N. C. Lombard
Attorney.

(No Model.)  6 Sheets—Sheet 3.

J. B. HADAWAY.
STITCH SEPARATING AND INDENTING MACHINE.

No. 537,823.  Patented Apr. 23, 1895.

Witnesses:  Fig. 3.  Inventor:
Walter E. Lombard  John B. Hadaway,
H. Theodore Fletcher  by N. C. Lombard
  Attorney.

THE NORRIS PETERS CO., PHOTO-LITHO., WASHINGTON, D. C.

(No Model.) 6 Sheets—Sheet 4.
J. B. HADAWAY.
STITCH SEPARATING AND INDENTING MACHINE.

No. 537,823. Patented Apr. 23, 1895.

Fig. 4.

Witnesses:
Walter E. Lombard
H. Theodore Fletcher

Inventor:
John B. Hadaway,
by N. C. Lombard
Attorney.

(No Model.)  6 Sheets—Sheet 5.

J. B. HADAWAY.
STITCH SEPARATING AND INDENTING MACHINE.

No. 537,823. Patented Apr. 23, 1895.

Witnesses  
Walter E. Lombard  
H. Theodore Fletcher

Inventor:  
John B. Hadaway,  
by N. C. Lombard  
Attorney.

(No Model.)  6 Sheets—Sheet 6.
J. B. HADAWAY.
STITCH SEPARATING AND INDENTING MACHINE.

No. 537,823. Patented Apr. 23, 1895.

Fig. 18.

Witnesses:
Walter E. Lombard
H. Theodore Fletcher

Inventor:
John B. Hadaway,
by N. C. Lombard
Attorney.

UNITED STATES PATENT OFFICE.

JOHN B. HADAWAY, OF BROCKTON, MASSACHUSETTS.

STITCH SEPARATING AND INDENTING MACHINE.

SPECIFICATION forming part of Letters Patent No. 537,823, dated April 23, 1895.

Application filed September 29, 1894. Serial No. 524,533. (No model.)

*To all whom it may concern:*

Be it known that I, JOHN B. HADAWAY, of Brockton, in the county of Plymouth and State of Massachusetts, have invented certain new and useful Improvements in Stitch Separating and Indenting Machines, of which the following, taken in connection with the accompanying drawings, is a specification.

My invention relates to stitch separating and indenting machines, is an improvement upon the machine described in the Letters Patent No. 521,978, granted to me June 26, 1894, and it consists in certain novel features of construction, arrangement and combination of parts which will be readily understood by reference to the description of the accompanying drawings and to the claims hereto appended and in which my invention is clearly pointed out.

The object of my present invention is to prevent the possibility of skipping stitches when the variation in the length of the stitches in any given sample of work is excessive, and to this end I construct the machine as illustrated in the accompanying drawings, in which—

A is the bed of the machine, provided with the legs A' A' and the upwardly projecting stands A² A² in bearings in which is mounted the shaft B having mounted, upon one end thereof, the hand wheel C, upon its other end the grooved driving wheel D and between its two bearings the side path cams E and F and the cylinder path cam G.

Figure 2:
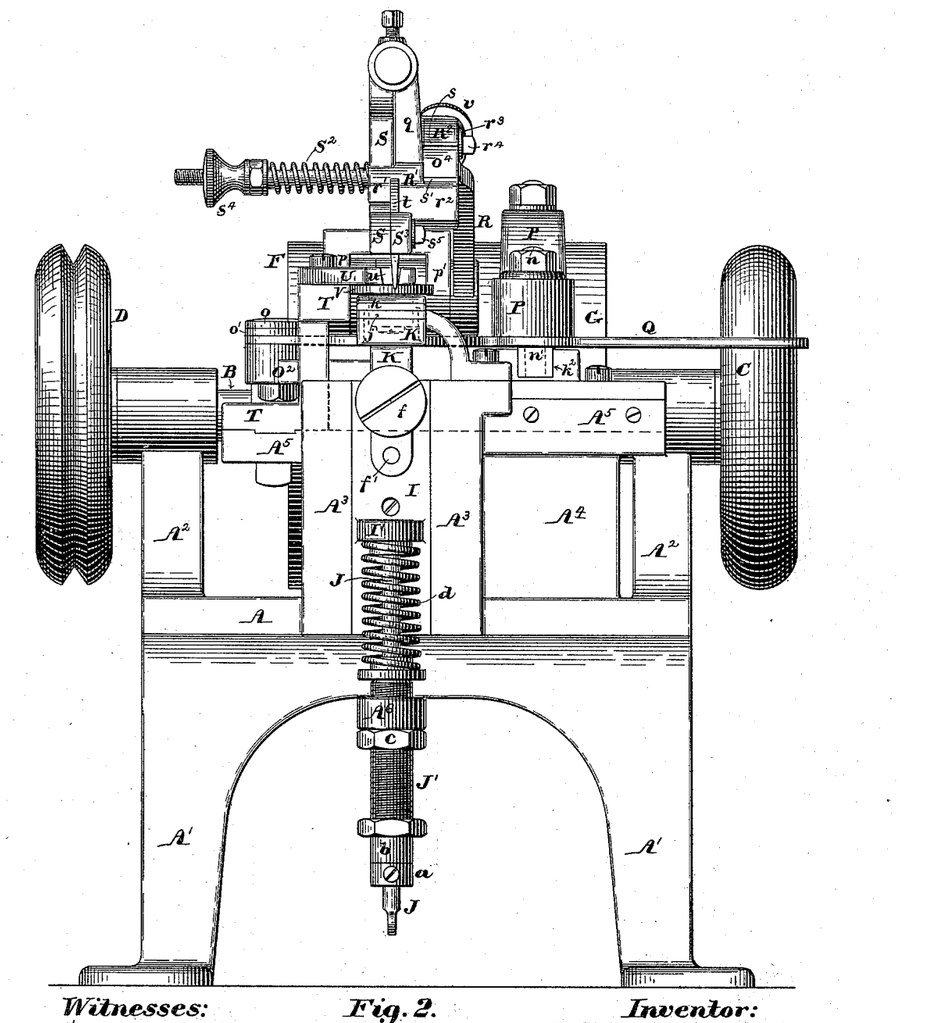
Fig. 2 is a front elevation of the same.
Figure 3:
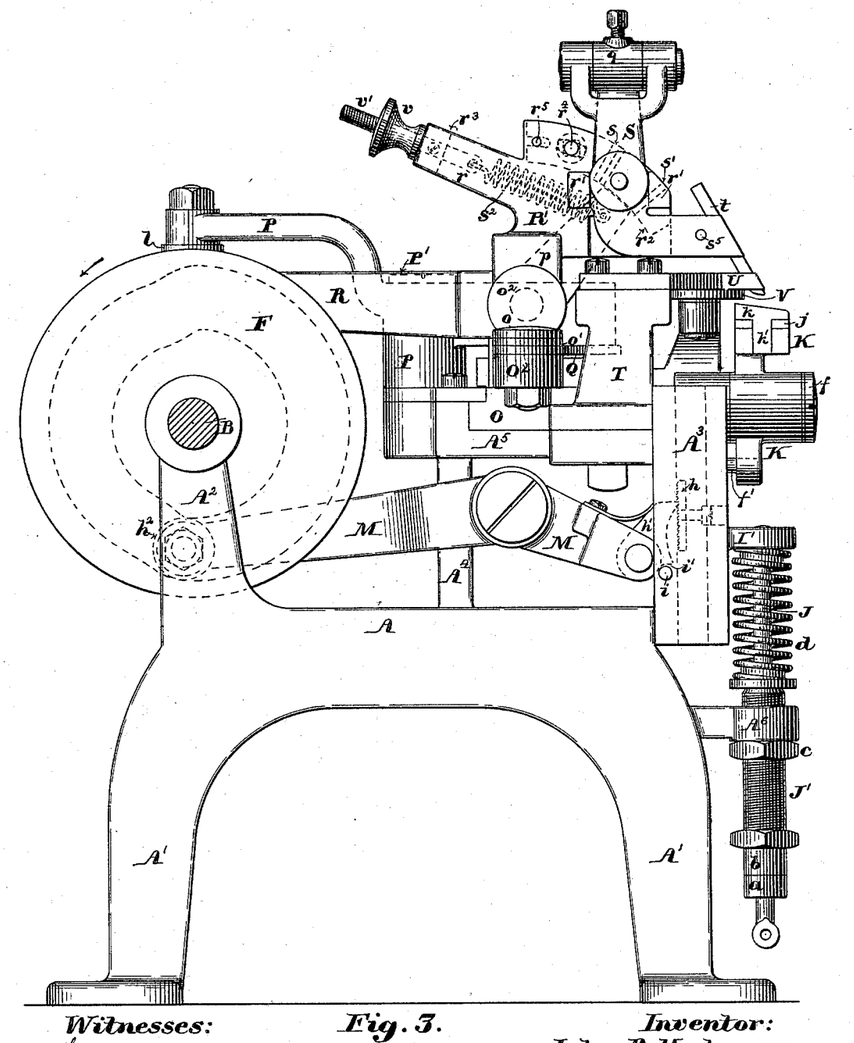
Fig. 3 is a side elevation looking at the left hand side of Fig. 2.
Figure 4:
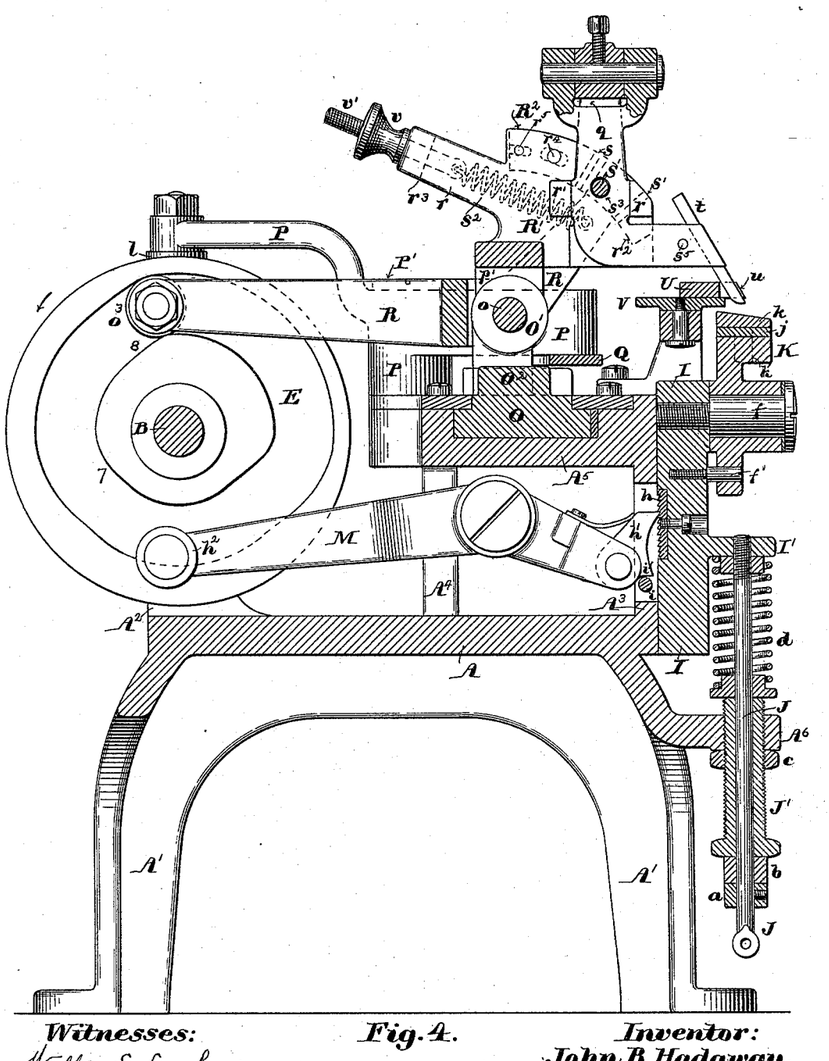
Fig. 4 is a vertical section on line 2, 2, on Fig. 1.

The bed A has formed in one piece therewith the upwardly projecting blocks A³ and A⁴ connected together at their upper ends by the plate A⁵ as shown in Figs. 2, 3, and 4.

I is a vertically movable bar fitted to a T shaped groove formed in the front face of the block A³ and provided with the lug I' in which is secured the pendent rod J provided with the threaded sleeve J' adjustably set in the ear A⁶, and with the collar $a$, the rubber cushion $b$, the check-nut $c$, and the coiled spring $d$, and constructed and arranged to be connected to a treadle (not shown).

The upper end of the bar I has secured thereto by means of the stud or clamping bolt $f$ and the steady-pin $f'$ the work support K so as to be movable vertically therewith said bar and work support being pressed upward with a yielding pressure by the spring $d$, and said bar has set in its back side the hardened steel ratchet plate $h$ the teeth of which are engaged by the pawl or pawls $h'$ carried by the lever M, pivoted to the block A⁴ and carrying at its rear end the roll $h^2$, fitted to and acted upon by the cam path, of the cam F, shown in dotted lines in Fig. 3, to vibrate said lever about its fulcrum pin and cause the pawls $h'$ to engage, or be disengaged from, the teeth of the ratchet plate $h$, the block A³ having a slot cut through its back to permit access of the pawls $h'$ to the plate $h$, and said block A³ has set therein the pin $i$ with which the shoulder $i'$ on the pawls engage when the front end of the lever M is moved downward.

Figure 1:
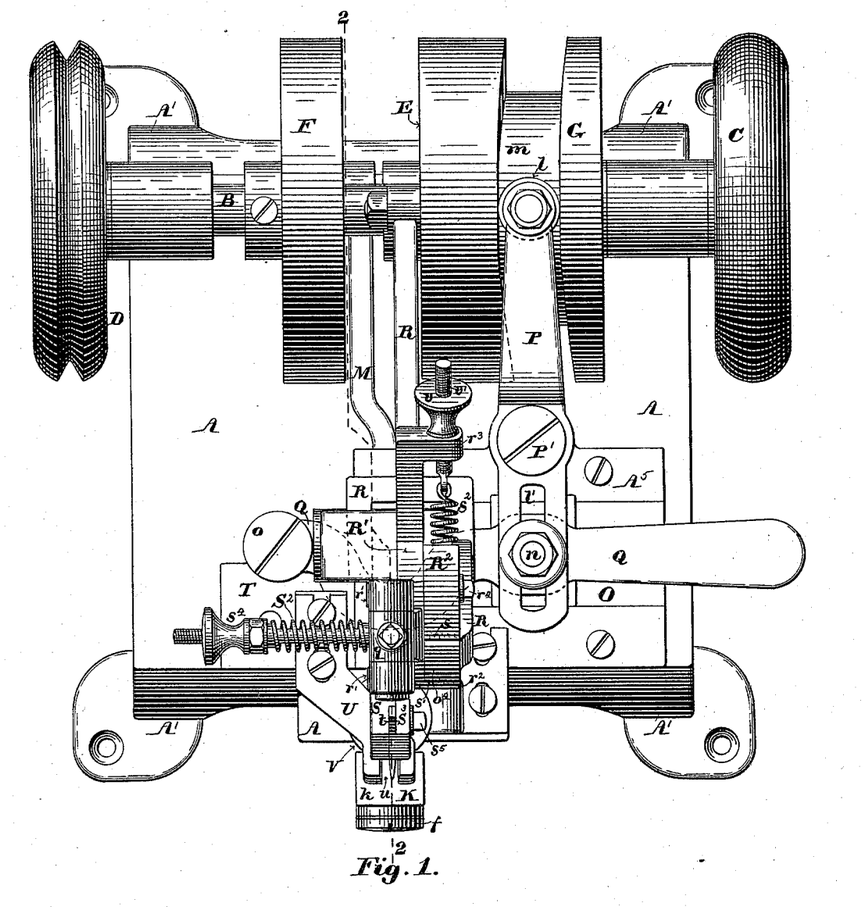
Figure 1 of the drawings is a plan of a machine embodying my invention.

The plate A⁵ has formed in its upper surface a rectangular T shaped groove in which is fitted so as to be movable endwise therein the feed slide O as shown in Figs. 1, 3, and 4.

So far the machine is constructed substantially the same as the machine described in my before cited Letters Patent except that one less cam is used and path cams are used instead of face cams and the lower work support K is secured to the bar I in a fixed position and may be constructed of a single piece of metal with its upper surface inclined toward the front or it may be provided with a detachable plate $k$ having two downwardly projecting pins or lugs $k'$, $k'$, which fit into slots formed in the opposite sides of the main body K of the support, with a cushion $j$ of rubber or other elastic material interposed between said parts as shown in Figs. 3 and 4.

Figure 5:
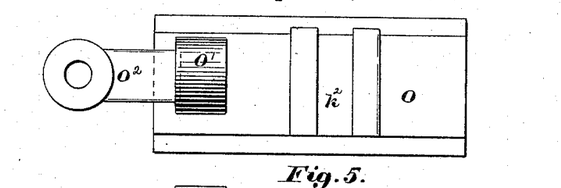
Figs. 5 and 6 are respectively a plan and a front elevation of the reciprocating slide which carries the stitch separating and indenting tool and its lever.
Figure 6:
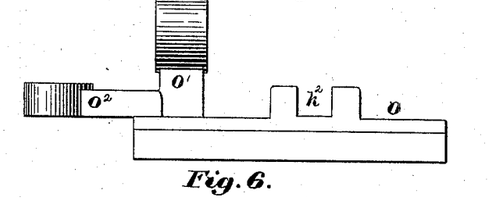
Figures 7, 13, 16:
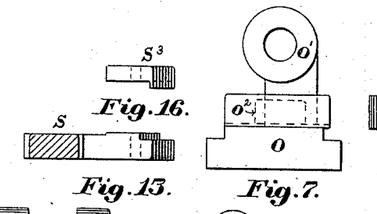
Fig. 7 is an end elevation of said slide looking at the right hand end of Fig. 6.
Figs. 13, 14 and 15 are respectively a sectional plan, a side elevation and a front elevation of the main body of the tool stock.
Figs. 16 and 17 are respectively a plan and a side elevation of the binding plate for clamping the tool to the tool stock.

The feed plate or slide O has formed in its upper side the transverse groove $k^2$ and has also formed in one piece therewith the upwardly projecting ear O' and the horizontally projecting extension $O^2$ as shown in Figs. 5, 6, and 7.

P is the feed lever mounted upon the vertical fulcrum pin or stud P' set in the plate $A^5$ and provided at its rear end with the cam truck $l$ fitted to, and acted upon by, the path $m$ of the cylinder cam G, to vibrate said lever about said fulcrum pin, said lever having formed in its forward arm the longitudinal slot $l'$, in which is fitted, so as to be adjustable endwise thereof, the stud $n$, upon the lower end of which is mounted the rectangular block $n'$ fitted to and movable in the transverse groove $K^2$ as shown in Figs. 1 and 2.

Q is a lever pivoted to the extension $O^2$ of the feed plate O by means of the fulcrum bolt $o$, with a disk $o'$ of leather or other suitable frictional material interposed between said lever and the head of said clamping bolt, and perforated at or near the middle of its length for the passage of the stud $n$ so that by moving the free end of said lever the block $n'$ may be adjusted in the slot $l'$ and groove $k^2$ to increase or diminish the travel of the feed slide or plate O, without stopping the operation of the machine, if desired.

Figure 18:
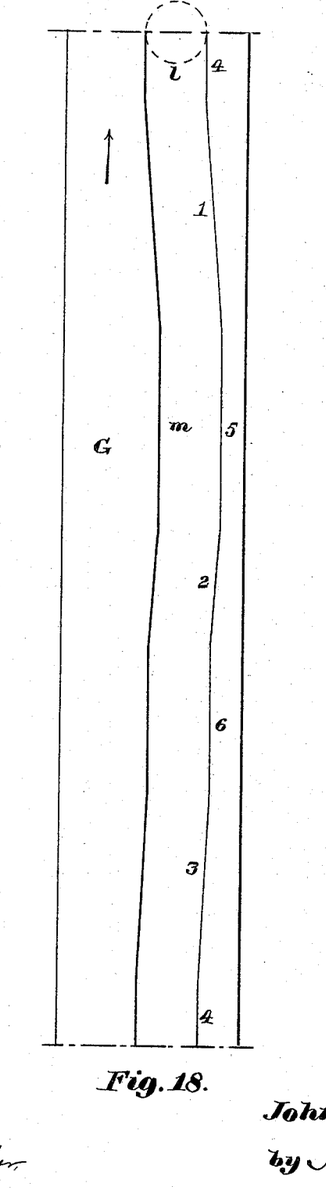
Fig. 18 is a development of the periphery of the cylinder cam for operating the feed slide projected on a flat plane.

The cylinder cam G is provided with the path $m$ having the throws 1, 2, and 3, and the stand stills 4, 5, and 6 as illustrated in Fig. 18 where the periphery of the cam is developed upon a flat plane.

The ear O' of the feed plate O has set therein the fulcrum pin $o^2$ upon which are mounted so as to be movable about the axis thereof the lever R and the tool-stock carrying segment R', said lever R carrying at its rear end the truck $o^3$ fitted to and acted upon by the path of the cam E.

Figures 8, 9, 17:
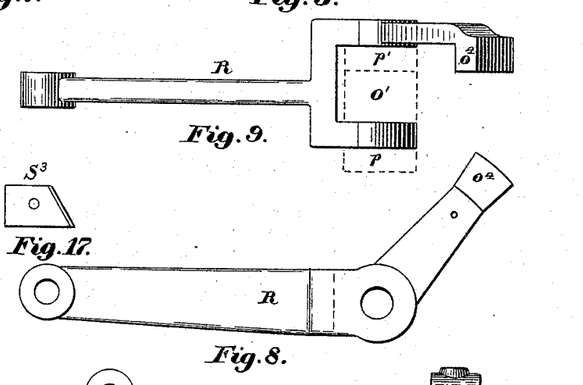
Figs. 8 and 9 are respectively a plan and an elevation of the cam lever for operating the tool carrying stock and segment.

The lever R has its front end forked, one arm of the fork being extended forward and upward from the fulcrum-pin $o^2$ to form a short arm thereof, the end of which has the offset or laterally projecting lug $o^4$ as shown in Figs. 8 and 9.

Figure 10:
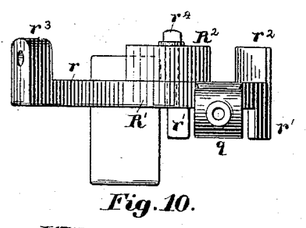
Figs. 10, 11 and 12 are respectively a plan, a side elevation and a front elevation of the tool-stock carrying segment.
Figure 11:
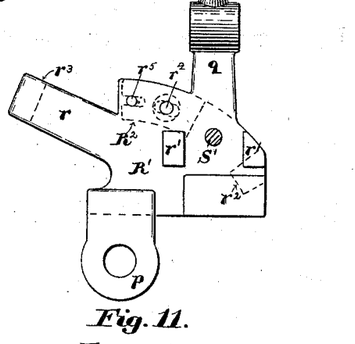
Figure 12:
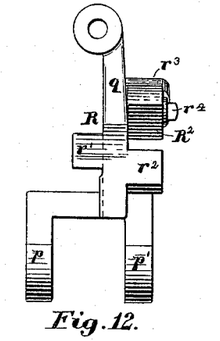

The segment R' is provided with the two downwardly projecting ears $p$ and $p'$ which bear the relation to the forked end of the lever R and the ear O' of the feed plate indicated by dotted lines in Fig. 9. The segment R' is provided with the upwardly projecting arm $q$, the rearwardly and upwardly projecting arm $r$ and with the laterally projecting lugs $r'$ $r'$ $r^2$ and $r^3$ as shown in Figs. 10, 11 and 12. The segment R' also has adjustably secured thereto by means of the clamping bolt $r^4$ and the steady-pin $r^5$ the segmental block $R^2$ as shown in Figs. 10, 11, and 12.

The inner or opposing faces of the lug $r^2$ and the block $R^2$ have secured thereto pieces of leather $s$, and $s'$, against which the end of the short arm of the lever R alternately contacts to move the segment R' in opposite directions about its axis of motion.

The segment R' is normally drawn forward by the tension of the spring $s^2$ connecting the lug $r^3$ and the short arm of the lever R, so that the leather $s$ attached to the adjustable block $R^2$ will be in contact with the back side of the end portion of the short arm of the lever R until a resistance is presented to the downward movement of the front portion of the segment R when the downward or forward movement of the segment will be arrested until the front side of the short arm of the lever R comes in contact with the leather $s'$ on the lug $r^2$, the spring $s^2$ yielding to permit such movement.

Figures 14, 15:
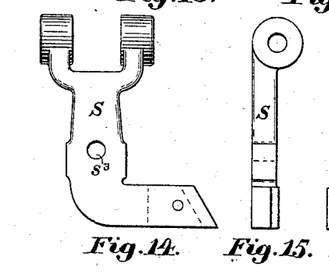

S is the tool stock made of the form shown in Figs. 14 and 15 and pivoted by its upper end to the upper end of the arm $q$ of the segment R' with its central portion between the two lugs $r'$, $r'$, as shown.

A long stud S' is set in a fixed position in the segment R' below the arm $q$ and projects laterally therefrom passing freely through the hole $s^3$ formed in the tool stock S, and has fitted to its outer end the thumb nut $s^4$ and is surrounded between said nut and the tool stock with the spring $s^2$ the tension of which tends to press said tool stock into contact with the segment R' as shown in Figs. 1 and 2.

The tool stock S has clamped thereto by means of the lipped plate $S^3$ and the clamping bolt $s^5$ the indenting tool $t$ as shown in Figs. 1, 2, 3 and 4.

T is a stand bolted to plate $A^5$ at its left hand end, to the upper end of which is adjustably secured the upper work support or table U provided in its front end, with the slot $u$ for the passage of the indenting tool $t$ substantially as in my before cited patent.

The tension of the spring $s^2$ may be regulated by means of the thumb nut $v$ and the threaded rod $v'$ set in the lug $r^3$ as shown in Figs. 1, 3, and 4.

The operation of my invention is as follows: The several parts of the machine being in the positions shown in the drawings, that is, with the indenting tool depressed and the feed slide at the extreme of its movement toward the right of Fig. 1, the operator first turns the hand wheel C in the direction indicated by the arrow on Fig. 3 a distance equal to about one hundred and fifty degrees when the feed slide carrying the separating and indenting tool will have been moved to the extreme of their movement toward the left of said figure and the separating tool will have been raised to its extreme height by an upward movement of the front end of the lever R, and the work support will have been unlocked by the downward movement of the front end of the lever M causing the shoulder $i'$ on the pawl or pawls to come in contact with the pin $i$ and throw the pawl or pawls out of engagement with the teeth of the ratchet plate $h$ on the bar I. The operator then places his foot upon the treadle connected with the bar I (but not shown) and depresses the lower work support K against the tension of the spring $d$ to a sufficient distance to permit the insertion of the sole edge between said lower work support and the table or upper work support U. He then takes the shoe in his left hand with the heel toward the left, places the tread surface of the sole upon the lower work support at a point at the forward part of the shank with the upper surface of the welt beneath the table and the edge of the sole against the gage V, which is constructed and arranged as described in my prior patent before cited, and has previously been adjusted to a position to bring the stitches to be operated upon directly beneath the bulge on the lever end of the separating tool $t$, and then removes his foot from the treadle, when the tension of the spring $d$ will raise the lower work support, and cause the sole edge to be clamped between it and the table U, and then the cam shaft is set in motion. The first effect produced by the revolution of the cam shaft is to cause the pawl to engage the ratchet teeth on the bar I, by an upward movement of the front end of the lever M, and thus lock the lower work support so that it cannot yield to the pressure applied to the sole by the separating and indenting tool, and thus clamp the sole to be operated upon in position. The next effect produced by the revolution of the cam shaft is to cause the front end of the lever P to move toward the right a sufficient distance to move the feed slide O in the same direction a distance equal to about one half of its entire reciprocation said movement being caused by the throw 2, of the path of the cylinder cam G'. The entire reciprocation of the feed slide O should be about one and one third times the length of the average of the stitches in the sample of work to be operated upon, the stud in the slotted forward arm of the feed lever P having previously been adjusted to the proper point to impart to said slide the desired length of movement. This movement of the slide O to the right of about one half its entire reciprocation causes the lever R, segment R' and the tool stock S, with the tool $t$ carried thereby, to be moved an equal distance, say about two-thirds the length of an average stitch, in the same direction, which occurs while the tool $t$ is raised above the upper surface of the line of stitches. When this first movement of the feed slide toward the right is completed the throw 7 of the cam E, acting upon the truck $o^2$ will cause the front end of the lever R to be moved downward about one half of its throw thereby allowing the tension of the spring $s^2$ to cause the separating tool $t$ to bear upon the upper surface of a stitch with a yielding pressure, the tool stock S being held in contact with the segment R' by the tension of the spring $s^2$. The continuation of the rotation of the cam shaft will cause the feed slide O, with the lever R and segment R', to be moved to the extreme limit of their movement toward the right by the action of the throw 3 of the cylinder cam G upon the truck $l$ carried by the rear end of the lever P. The upper end of the tool stack S being pivoted to the arm $q$ of the segment R' as a matter of course moves with said segment to the full limit of the movement toward the right; but the lower end of the tool $t$ being pressed downward upon the stitch with a light pressure moves in the same direction only until it reaches the depression between the stitch upon which it has been resting and the stitch next to the right thereof when the end of said tool will drop into said depression and its movement toward the right will be arrested and the continuation of the movement of the feed slide and the segment R' toward the right will cause the tool stock S to move about its pivotal axis and assume a more or less inclined position, the spring $s^2$ yielding to permit such movement, and the lower end of the tool $t$ acting as a fulcrum about which the tool stock moves in assuming such position. The next movement in order is the completion of the downward movement of the front end of the lever R, caused by the throw 8 of the cam E acting upon the truck $o^3$ carried by the rear end of the lever R, thereby causing the front end of said lever R to come in contact with the lug $r^2$ of the segment and force the end of the tool between the stitches and thus indent the welt and clearly define the limits of the stitches. A further rotation of the cam shaft causes the front end of the lever M with the pawl or pawls carried thereby to be depressed, thus unlocking the lower work support preparatory to feeding the work, which is now done by the throw 1 of the cylinder cam G acting upon the truck $l$ carried by the lever P, and moving the feed slide to the extreme of its movement toward the left during the first part of which movement of said slide the segment R' and the upper end of the tool stock are moved toward the left without moving the work until the tool stock and tool have assumed their original upright positions and the central portion of the tool stock is pressed into contact with the segment R' by the tension of the spring $S^2$, and during the last part of the movement of said slide toward the left the lower end of the tool $t$, still pressed into the space between the stitches, moves with said slide and the segment R' toward the left, carrying with it the work a distance equal to the length of the stitch against which it is acting, and the tool is raised at which time a revolution of the cam shaft has been completed.

In the machine described in my prior patent the separating and indenting tool moved from the right toward the left to locate the stitch and then continued to move in the same direction to feed the work while in my present invention the tool moves from the left toward the right to locate the stitch and in the opposite direction to feed the work, by which arrangement perfectly accurate separation of the stitches can be accomplished without skipping stitches, with very much greater variation in the lengths of the stitches than can be done with the machine described in my prior patent.

What I claim as new, and desire to secure by Letters Patent of the United States, is—

1. In a machine for separating the stitches on boot and shoe soles the combination of a work support; an automatically adjustable separator for locating the intervals between the stitches whether of uniform or varying lengths; and means for moving said tool in one direction to locate the interval between the stitches and means for moving said tool in the opposite direction to feed the work.

2. In a machine for separating the stitches on boot and shoe soles the combination of a work support; an automatically adjustable separator for locating the intervals between the stitches whether of uniform or varying lengths; means for moving said separator in one direction to locate the intervals between the stitches; means for pressing said separator between the stitches when the point of said separator has located itself between two stitches; and means for moving said separator in the opposite direction to feed the work.

3. In a machine for separating the stitches on boot and shoe soles, the combination of a work support; a gage to locate the work on said support; an automatically adjustable separating tool for locating the intervals between the stitches whether of uniform or varying lengths; means for moving said tool in one direction to locate said intervals and means for moving said tool in the opposite direction to feed the work.

4. In a machine for separating the stitches on boot and shoe soles, the combination of a work support; a gage to locate the work on said support; an automatically adjustable separating tool for locating the intervals between the stitches whether of uniform or varying lengths; means for moving said tool in one direction to locate said intervals; means for forcing said tool into the depression between two stitches; and means for moving said tool in the opposite direction to feed the work.

5. In a machine for separting the stitches on boot and shoe soles, the combination of a work support to receive the tread surface of the sole; an upper work support or table to rest upon the upper surface of the welt; a gage to determine the position of the work on the support; an automatically adjustable separating tool for locating the intervals between the stitches; means for moving said tool in one direction to locate said intervals; means for moving said tool in the opposite direction to feed the work; and mechanism for forcing said tool into said intervals when it has located itself in the space between two stitches.

6. In a machine for separating the stitches on boot and shoe soles, the combination of a work support; a reciprocating feed slide; a cam and cam lever for operating said slide; an adjustable fulcrum pin connecting said slide to said cam lever; a hand lever fulcrumed on said slide and engaging said adjustable fulcrum pin and adapted to adjust said fulcrum pin when the machine is in operation or at rest.

7. In a machine for separating the stitches on boot and shoe soles the combination of a work support to receive the tread surface of the sole; an upper work support or table to rest upon the upper surface of the welt; a gage to determine the position of the work on its support; a horizontally reciprocating feed slide; a cam and cam lever for operating said slide; an adjustable block and pin connecting said cam lever and slide; the segment R' pivotally mounted upon said slide and provided with the lug $r^2$ and the adjustable block $R^2$; the lever R fulcrumed upon the same pin as said segment and arranged with the end of its short arm between the lug $r^2$ and the block $R^2$; a spring connecting the short arm of said lever and said segment and arranged to normally hold the block $R^2$ of said segment in contact with the short arm of said lever; a cam for vibrating said lever R in two steps in one direction and in a single step in the opposite direction; the tool stock S pivoted by its upper end to an arm of said segment; the tool $t$ carried by said stock; and the spring $s^2$.

8. In a machine for separating the stitches on boot and shoe soles the combination of a work support; a reciprocating feed slide; a cam and cam lever for operating said slide; an adjustable block-carrying pin connecting said lever and slide; a hand lever fulcrumed on said slide and embracing said pin for adjusting said pin to vary the travel of said slide; a cam lever and a tool stock carrying arm or segment both mounted upon a common horizontal fulcrum-pin carried by said slide, said arm or segment being provided with two lugs or abutments with which the short arm of the cam lever alternately engages; a spring connecting said cam lever and segment and tending to hold the short arm of said cam lever in contact with one of said abutments; a tool stock pivoted by its upper end to said segment; a separating tool carried by said tool stock; a spring tension for pressing said tool stock, normally against said segment; and a cam for operating said cam lever and segment constructed and arranged to move the front end of said cam lever downward in two successive steps with a stand still between them.

9. In a machine for separating the stitches of boot and shoe soles the combination of a work support having a flat upper surface inclined toward the front to receive the tread surface of the sole; an upper work support or table to rest upon the welt; an automatically adjustable separating tool for locating the intervals between the stitches whether of uniform or varying lengths; and means for forcing said tool between the stitches when the point of said tool has located itself in the space between two stitches.

10. In a machine for separating the stitches on boot and shoe soles the combination of a non revoluble work support made in two parts with an elastic cushion between said parts; an upper work support or table to rest upon the upper surface of the welt; an automatically adjustable separating and indenting tool for locating the intervals between the stitches whether of uniform or varying lengths; and means for forcing said tool between the stitches when it has located itself in the space between two stitches.

11. In a machine for separating the stitches on boot and shoe soles the combination of a non revoluble work support made in two parts with an elastic cushion between said parts and having a flat upper surface inclined toward the front; an automatically adjustable separating tool for locating the intervals between the stitches whether of uniform or varying lengths; means for moving said tool in one direction to locate said intervals; means for moving said tool in the opposite direction to feed the work; and means for forcing said tool between the stitches when it has located itself in the space between two stitches.

In testimony whereof I have signed my name to this specification, in the presence of two subscribing witnesses, on this 15th day of September, A. D. 1894.

JOHN B. HADAWAY.

Witnesses:
N. C. LOMBARD,
WALTER E. LOMBARD.